US011669840B2

(12) United States Patent
Xu

(10) Patent No.: US 11,669,840 B2
(45) Date of Patent: Jun. 6, 2023

(54) SYSTEM AND METHOD FOR MANAGING ASSOCIATIONS IN AN ONLINE NETWORK

(71) Applicant: Yuzhen Xu, Toronto (CA)

(72) Inventor: Yuzhen Xu, Toronto (CA)

( * ) Notice: Subject to any disclaimer, the term of this patent is extended or adjusted under 35 U.S.C. 154(b) by 0 days.

(21) Appl. No.: 17/126,645

(22) Filed: Dec. 18, 2020

(65) Prior Publication Data
US 2021/0209607 A1    Jul. 8, 2021

Related U.S. Application Data

(60) Provisional application No. 62/950,901, filed on Dec. 19, 2019.

(51) Int. Cl.
*G06Q 20/40*    (2012.01)
*G06Q 50/00*    (2012.01)
*G06Q 20/38*    (2012.01)
*H04L 9/40*    (2022.01)

(52) U.S. Cl.
CPC ..... *G06Q 20/40145* (2013.01); *G06Q 20/389* (2013.01); *G06Q 50/01* (2013.01); *H04L 63/0861* (2013.01)

(58) Field of Classification Search
CPC ........ G06Q 20/40; G06Q 20/38; G06Q 50/00; H04L 29/06
USPC .......................................................... 705/44
See application file for complete search history.

(56) References Cited

U.S. PATENT DOCUMENTS

| | | | | |
|---|---|---|---|---|
| 7,458,508 | B1* | 12/2008 | Shao | G06Q 20/04 235/380 |
| 7,562,814 | B1* | 7/2009 | Shao | G06F 21/552 235/375 |
| 7,686,214 | B1* | 3/2010 | Shao | G06Q 20/382 235/380 |
| 8,386,377 | B1* | 2/2013 | Xiong | G06Q 20/04 705/38 |
| 8,850,536 | B2 | 9/2014 | Liberman et al. | |
| 9,147,117 | B1* | 9/2015 | Madhu | G06K 9/00268 |
| 9,185,184 | B2 | 11/2015 | Bustamente | |
| 9,858,404 | B2* | 1/2018 | Calo | H04W 12/08 |
| 10,735,401 | B2* | 8/2020 | Lonas | B66B 7/02 |
| 2003/0126136 | A1* | 7/2003 | Omoigui | H04L 29/06 |
| 2006/0149674 | A1* | 7/2006 | Cook | G06Q 40/02 705/44 |
| 2010/0306099 | A1* | 12/2010 | Hirson | G06Q 20/382 705/38 |
| 2011/0252340 | A1 | 10/2011 | Thomas | |

(Continued)

FOREIGN PATENT DOCUMENTS

CA      3015146 C   *  2/2021   ......... H04L 63/1483

*Primary Examiner* — Ayal I. Sharon

(57) ABSTRACT

Disclosed herein is a system and a computer implemented method for managing associations between a plurality of entities in a safe, reliable, effective and efficient manner. The system leverages biometric authentication and identity verification to ensure authentic entity profiles and weed out fake profiles and transactions. Further, the system employs one or more artificial intelligence based algorithms to generate an integrity score for a registered entity based on veracity of information shared by an entity with other entities and with the platform, thereby eliminating fake claims made by registered entities to solicit proposals and connection requests.

12 Claims, 4 Drawing Sheets

(56) References Cited

U.S. PATENT DOCUMENTS

| | | | |
|---|---|---|---|
| 2013/0018795 A1* | 1/2013 | Kolhatkar | G06Q 20/4016 705/44 |
| 2013/0018796 A1* | 1/2013 | Kolhatkar | G06Q 20/28 705/44 |
| 2014/0114965 A1* | 4/2014 | Balduzzi | G06F 16/24 707/723 |
| 2014/0143326 A1* | 5/2014 | Rajaram | G06Q 30/02 709/204 |
| 2014/0143327 A1* | 5/2014 | Rajaram | H04L 51/52 709/204 |
| 2014/0221866 A1 | 8/2014 | Quy | |
| 2015/0269165 A1* | 9/2015 | Work | H04L 67/306 707/734 |
| 2017/0177586 A1* | 6/2017 | Balduzzi | G06F 16/9535 |
| 2017/0221010 A1* | 8/2017 | Brdiczka | G06F 16/9535 |
| 2017/0331828 A1* | 11/2017 | Caldera | H04L 63/104 |
| 2018/0039688 A1* | 2/2018 | Ahn | G06F 16/9024 |
| 2018/0097790 A1* | 4/2018 | Caldera | H04L 63/08 |
| 2018/0109507 A1* | 4/2018 | Caldera | G06N 20/00 |
| 2018/0211718 A1* | 7/2018 | Heath | A01K 29/005 |
| 2018/0349416 A1* | 12/2018 | Circlaeys | G06F 16/56 |
| 2019/0005021 A1* | 1/2019 | Miller | G10L 15/26 |
| 2019/0005024 A1* | 1/2019 | Somech | H04L 51/36 |
| 2019/0065609 A1 | 2/2019 | Finder | |
| 2019/0065610 A1* | 2/2019 | Singh | H04L 51/32 |
| 2019/0205148 A1* | 7/2019 | Schur | G06F 9/453 |
| 2019/0220863 A1* | 7/2019 | Novick | H04W 12/122 |
| 2020/0020062 A1* | 1/2020 | Shaw | G06Q 20/40 |
| 2020/0151826 A1* | 5/2020 | Ghaffar | G06Q 30/0202 |
| 2020/0250561 A1* | 8/2020 | Restrepo Conde | G06F 16/9024 |
| 2020/0273040 A1* | 8/2020 | Novick | H04W 12/122 |
| 2021/0160247 A1* | 5/2021 | Gaddam | H04L 63/20 |

* cited by examiner

SYSTEM AND METHOD FOR MANAGING ASSOCIATIONS IN AN ONLINE NETWORK

TECHNICAL FIELD

This disclosure relates to generally, to computer-based real time information exchange, and, more particularly, to moderated online dating, virtual dating and offline matchmaking services.

BACKGROUND

Online dating services have been heavily used worldwide by single individuals to find their potential romantic partners and even spouses. The economically and physically convenient access to the service via cell phones and desktops/laptops and internet, such matchmaking method has been extremely popular in recent few decades. However, due to the identity and verification issues, online dating is fraught with issues related to fake profiles, false statements, misrepresentations and duplicity of membership. These result in significant online dating frauds rates, emotional breakdown rates as well as financial losses rates increase year over year across the globe. Moreover, the recommendations from existing online platforms are not up to the mark and result in low dating satisfaction rates and higher dating failure rates due to mismatch in characteristics, personality and many other important personal traits of two individuals.

Conventionally, online dating sites do not verify the authenticity of users and this was clearly stated in their Terms of Service. Only some offline matchmaking companies require government issued identification information to register in their internal system to be manually matched. Further, some of them use manual curators to offer personalized or custom selected profiles for association.

However, use of manual curators may not provide the best recommendations since the limitation on human ability to match multiple data points. Further, such recommendations may not be provided in real-time based on manual operations. Furthermore, identification checks may fail to identify frauds due to lack of verifying data. Lastly, the issue of fake profile pictures might not get solved based on manual checks.

In light of above mentioned problems, there does not exist a solution that provides a risk free and authentic and efficient system and method to make and manage associations on an online platform such as a mobile phone to search for and communicate with desirable acquaintances at local social locations and to increase real-time engagement between a plurality of users.

SUMMARY

The present disclosure seeks to provide a system and a computer implemented method for managing associations between a plurality of entities in a safe, reliable, effective and efficient manner. The system leverages biometric authentication and identity verification to ensure authentic entity profiles and weed out fake profiles and transactions. Further, the system employs one or more artificial intelligence based algorithms to generate an integrity score for a registered entity based on veracity of information shared by an entity with other entities on the platform, thereby eliminating fake claims made by registered entities to solicit proposals and connection requests.

Embodiments of the present disclosure substantially eliminate or at least partially address the aforementioned problems.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

It will be appreciated that the drawings illustrated herein are for representation purposes only and do not intend to limit the scope of the present disclosure, and actual implementation of the present disclosure may be viewed substantially differently.

DETAILED DESCRIPTION

The following description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present invention discloses a system and a computer implemented method for managing associations between a plurality of entities in a safe, reliable, effective and efficient manner. The system leverages biometric authentication and identity verification to ensure authentic entity profiles and weed out fake profiles and transactions. Further, the system employs one or more artificial intelligence based algorithms to generate an integrity score for a registered entity based on veracity of information shared by an entity with other entities of the platform, thereby eliminating fake claims made by registered entities to solicit proposals and connection requests.

Figure 1:
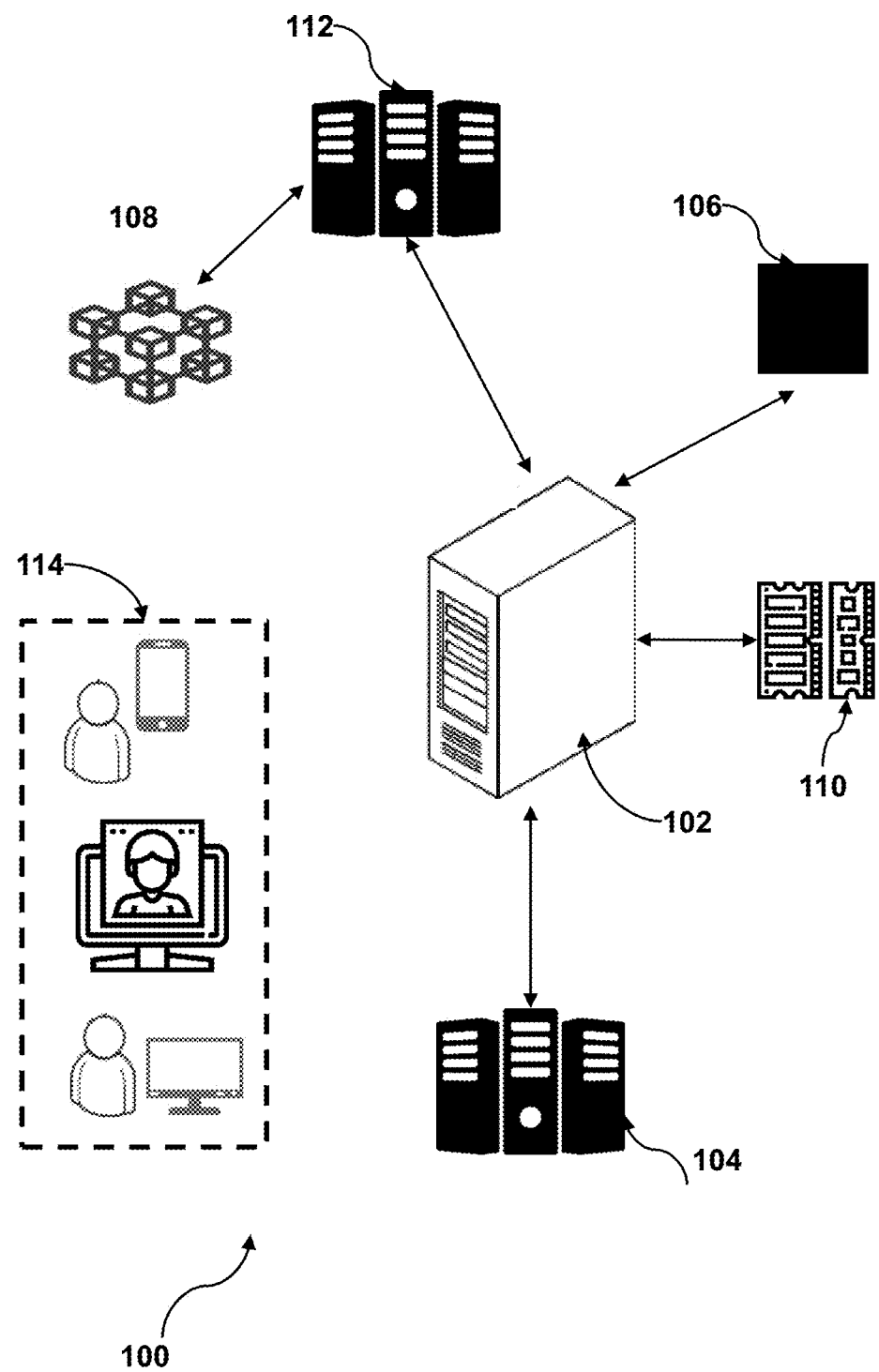
FIG. 1 illustrates a block diagram of an example system according to the present disclosure.

FIG. 1 illustrates a block diagram of an example system according to the present disclosure, for implementation of a system for managing associations in an online network 100 according to the present disclosure. The system 100 comprises a processing unit 102 communicably coupled, via a data communication network 108, to a biometric server 104 and a database arrangement 106. The processing unit further comprises a memory 110 to store executable instructions. The system further comprises an identity server 112 in communication with a blockchain configured to store one or more user credentials.

In an aspect of the present invention, the processing unit 102 is configured to accept a request for registration from a plurality of entities. In a preferred embodiment, the entities are individuals looking to solicit and/or offer connection to, and from, other individuals. Each of the plurality of entities may register with the system through their respective client devices 114a1, 114a2, 114a3 (collectively "client devices 114"), The processing unit 102 is operable to generate a registration link accessible by the entities through a web browser or a mobile application on their respective client devices 114.

Figure 2:
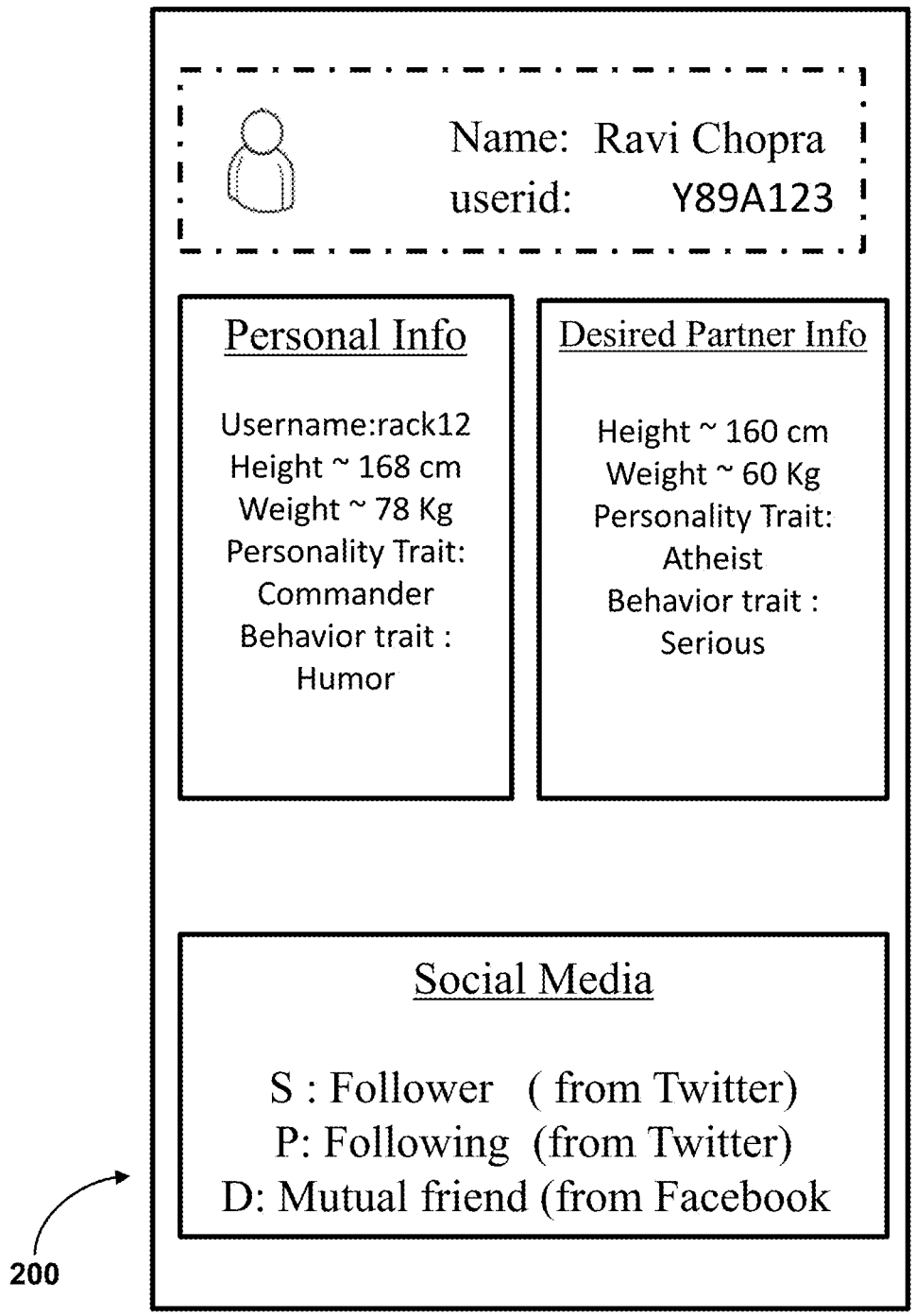
FIG. 2 depicts an entity profile as per the present disclosure.

Each of the plurality of entities willing to register with the system 100 is required to submit information that is used by the processing unit 102 to create an entity profile wherein the entity profile is distinct for each of the plurality of entities. The registration of an entity with the system requires the entity to submit personal information, though a graphical user interface associated with the client device, such as name, username, address, current address, professional qualifications, a recent picture as profile image, social security number etc. The processing unit 102 is operable to generate a unique identifier for each entity profile based on the submitted personal information. Further, each of the plurality of entities is required to submit information and preferences related to personality traits, sexual compatibility, and behavioral aspects. Moreover, similar preferences and information related to potential partners is also collected from the entity and saved as desired partner traits. In an embodiment, said information is collected by means of a questionnaire with input from the entity registering with the system. Optionally, said information may be determined by the processing unit 102 through performance of the entity in one or more visual tests offered through the graphical user interface of the client devices. Said information and preferences are stored in the entity profile in the form of one or more attributes. Optionally, in some embodiments, an entity may be required to submit genomic data and DNA samples as a part of the entity profile. Furthermore, an entity is requested for preconfigured permissions to access one or more social media profiles associated with the entity. FIG. 2 depicts an entity profile as per the present disclosure.

Figure 3:
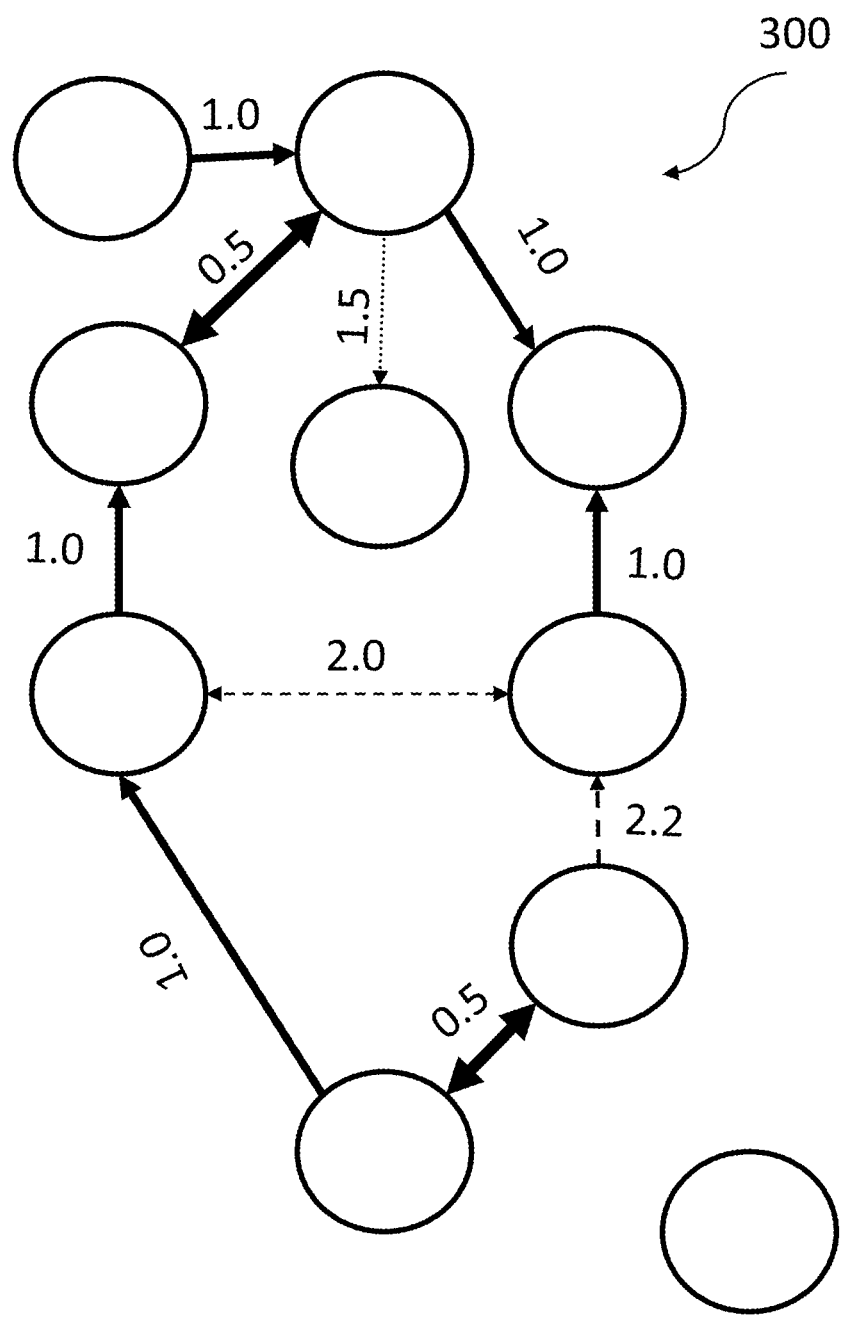
FIG. 3 depicts a network graph as per the preferred embodiment of the present invention.
Figure 4:
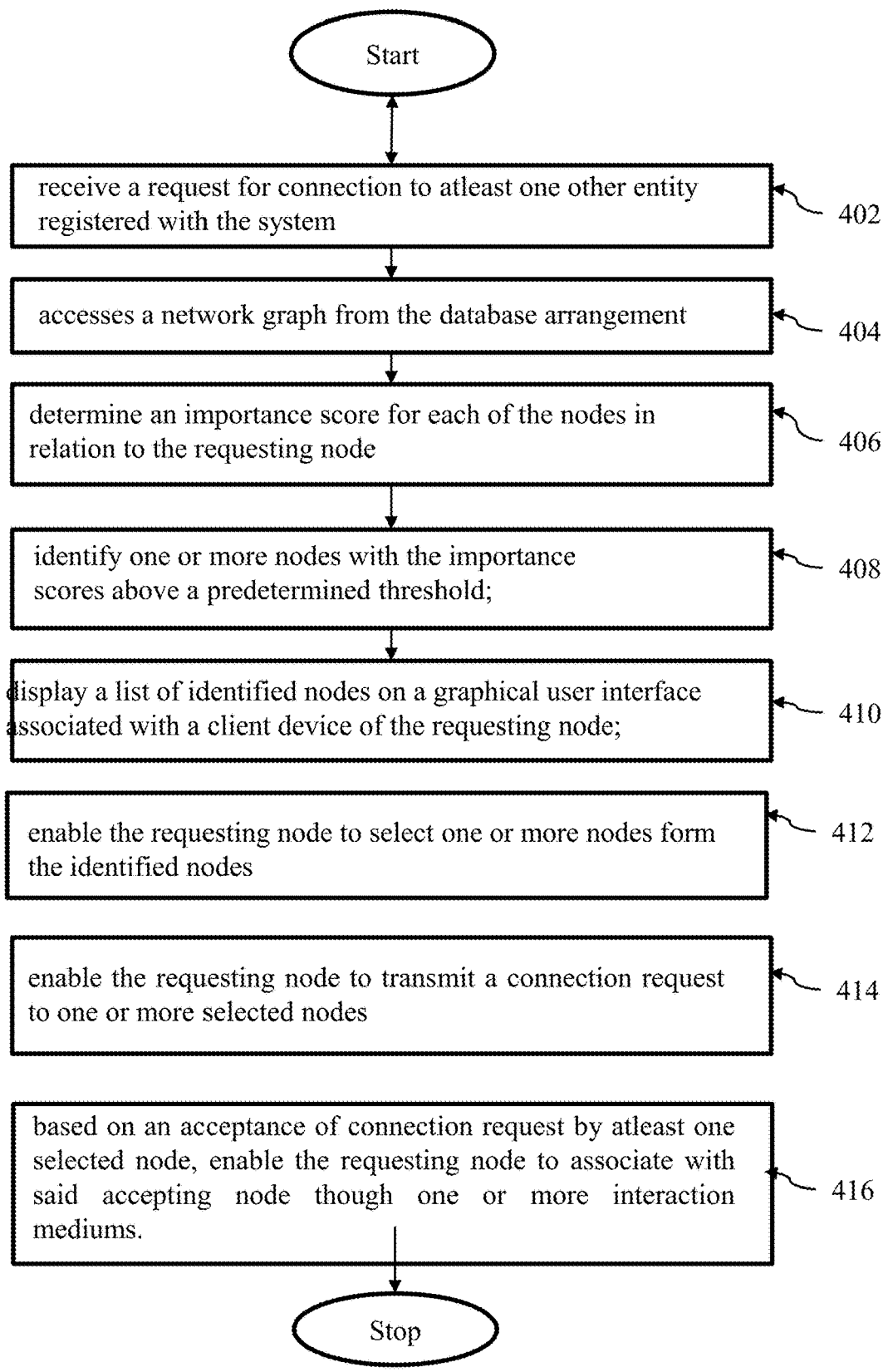
FIG. 4 depicts a flowchart describing the method steps as per a preferred embodiment of the present invention.

The processing unit 102 is further operable to store the entity profile along with the unique identifier in the database arrangement. Any information related to the entity may be retrieved by the processing unit 102. In a preferred embodiment of the present invention, the plurality of entities is saved in form of a network graph in the database arrangement wherein the network graph comprises pre-identified connections for the plurality of entities, based on the entity profile for each of the plurality of entities. Each node of the network graph represents an entity registered with the system and the edges between the nodes represent relationships between the entities. Said relationships may be direct or inferred. Edges in the form of direct relationship may be formed based on a two-way communication between the two entities. Optionally, edges in the form of direct relationships may also be formed based on a positive response gesture on the entity profile of one entity by the other entity. Further, edges in the form of inferred relationships are formed based on connection between the two entities on one or more social media handles. As an example, if the two entities follow each other on Twitter or LinkedIn, that creates an inferred relationship between them. FIG. 3 depicts a network graph as per the present disclosure.

In an embodiment of the present invention, the processing unit 102 is configured to authenticate an entity through one or more biometric recognition methods. The one or more biometric recognition methods could be one of a face recognition, fingerprint scan, retina scan or a combination of two or more methods. The biometric recognition helps in weeding out fake entity profiles or duplicate entity profiles from the system. The entity registering with the system is required to submit at least one biometric data though a biometric device coupled to the client device 114. Said biometric data is stored within a biometric server communicably coupled to the processing unit 102 and associated with the unique identifier of the entity profile corresponding to the entity. In a preferred embodiment of the present invention, the biometric data is a facial image of the entity. The processing unit is operable to compare the facial image captured through the biometric recognition means with the current profile picture of the entity in the entity profile to assess whether both of them relate to the same entity. The processing unit is operable to analyze one or more facial features from the captured biometric facial data and the submitted current profile picture, compare said facial features and derive a match score for the entity. If the match score is above a given threshold, the processing unit determines that the entity is authentic. This helps in eliminating the issue of fake profile images used by one or more entities. In yet another embodiment of the present invention, said biometric data is used for payment processing for one or more services available to the entity on the system.

The processing unit 102 is communicably coupled to a blockchain ledger wherein the blockchain ledger comprises validated information from one or more government and professional institutes. Any information related to professional qualification or identity may be cross validated, by the identity server 112, through the blockchain ledger. Optionally, in another embodiment, the entity profile associated with each of the plurality of entities is saved in the blockchain and an audit trail is maintained for changes made by the entity to its entity profile. Therefore, any user may validate, through the identity server 112, information about the past associations of a particular entity and whether an entity has lied about his past associations and relationships. This results in transparency in communications and information symmetry between entities registered with the system 100.

Optionally, the plurality of entities are classified into one or more tiers based on entity profile information and an assessment report wherein different levels of services are provided to entities based on their designated tier. As an example a Tier-IV registered entity shall have priority service as compared to a Tier-I user. The assessment report is based on manual background checks and authentication and added to the entity profile. In an embodiment, direct communication between entities associated with different tiers may be prohibited based on security settings of an entity profile or based on such a selection made by the entity through their graphical user interface.

In an aspect of the present invention, the processing unit 102 is further operable to determine an importance score for each of the nodes in relation to a given node. The importance score is based on a correlation of one or more attributes from the entity profile of two nodes. As an example, the correlation may be based upon similar work profiles, personality traits of being extrovert or in some cases behavioral traits of being humorous or likes and dislikes such as travelling etc. The importance score is calculated on the basis of information available on the entity profile from the time of registration and the desired partner traits as provided. Throughout this disclosure, an importance score in relation to other nodes signifies a compatibility level of a node with the other nodes i.e. entities. Higher the importance score, higher is the compatibility level. In an embodiment of the present invention, the importance score is determined on the basis of one or more specific attributes selected by an entity.

In yet another aspect of the present invention, the processing unit is operable to leverage big data technology to calculate an integrity score for a registered entity by analyzing information related to the registered entity. An integrity score relates to veracity of statements made by the entity during his/her conversations with other entities, authenticity of information provided in entity profile and truthfulness of an entity during transactions on the system. The processing unit 102 is operable to analyze information related to the subject entity wherein the information is collated across chat conversations with other entities, information from one on more wearable devices connected to the system and worn by the subject entity, and information from one or more social media platforms related to the subject entity. The integrity score as calculated is associated with the entity profile. Optionally, the integrity score for a registered entity may be displayed to other entities based on the designated tier. As such, Tier-IV and Tier-III entities may be able to view an integrity score related to other entities of similar tiers which helps them to decide whether they want to continue or initiate their association with the said entity. In an example embodiment of the present invention, an entity might state in their entity profile information as having no past relationship. However, on an analysis of their social media profiles, the processing unit can find out such edits on relationship status thereby reducing an integrity score for the said entity since the two information contradict each other. Further, using big data algorithms, multiple such data points may be cross-referenced to predict, by the processing unit 102, one or more false statements or information from the entity.

In operation, an entity registered with the system 100, places a request for connection with at least one of the other registered entities with the system 100. In response to the said request, the processing unit is configured to access, from the database arrangement 106, a network graph for the plurality of entities registered with the system 100. As described above, the network graph is a graph database of one or more entities and their corresponding entity profile. The entity requesting the connection to other entities is identified and tagged as the requesting node on the network graph. The processing unit then calculates an importance score, for the requesting node, in relation to other nodes of the network graph. For calculating the importance score, the processing unit employs correlation of attributes between each pair of nodes being compared wherein the attributes are retrieved from the entity profile for said nodes. The processing unit 102 is configured to identify one or more nodes with an importance score above a predetermined threshold. In the preferred embodiment, the threshold may be set at 70% match. Alternatively, it can be further fine-tuned to any set threshold. The processing unit is further operable to display a list of said identified one or more nodes on a graphical user interface associated with a client device of the requesting node. In an embodiment, the processing unit is further operable to display, on the graphical user interface, entity profile for the identified one or more nodes.

The entity that placed a request for connection i.e. the requesting node may select one or more identified nodes on the graphical user interface and a connection request is transmitted to the said selected nodes. Such selection may be done on the basis of one or more preferred attributes, matching traits or higher integrity score. Optionally, the requesting node may not choose to send connection requests to one or more identified nodes but may provide a positive response gesture to one or more nodes. Said positive gesture response is recorded by the processing unit and is used to update the network graph. Alternatively, the requesting node may also provide a negative response gesture to one or more nodes. Said negative response gesture is recorded by the processing unit 102 and is used to update the network graph to ensure such recommendations are not shown to the requesting node in future. In effect, said negative response gestures add negative weight to the edges between the two nodes in the network graph. The processing unit 102 is further configured to communicate an acceptance of connection request from any of the selected nodes and enables the requesting node to associate with said node though one or more interaction mediums provided by the processing unit though the graphical user interface. The one or more interaction medium includes video calls, chat messages and email communication. The network graph is further updated based on acceptance of connection requests from any of the selected nodes.

In another embodiment of the present invention, an entity may input one or more selected preferences to the processing unit via an interactive smart chat-bot. The processing unit 102 is operable to compute the importance score in relation to other entities and display the result on the graphical user interface. This method can be used by an entity to narrow down their search for a potential partner based on the most granular level of attribute and compatibility. As an example, an entity may select only the DNA and genome report to initiate association with other entities.

In yet another embodiment, the processing unit is configured to sort the one or more identified node based on the importance score and display the sorted list on the graphical user interface.

Client devices 114a1-a3 (collectively "client devices 110") are depicted as a mobile phone 110a1-a3 and a desktop computer 110b1-b3, respectively, but client devices 114 may comprise any type of computing device, such as a desktop computer system, a laptop, cellular phone, a smart device, a mobile telephone, a tablet style computer, or any other device capable of wireless or wired communication. In some implementations, client devices 114 are configured to interact with the processing unit 102 via an application, such as a web browser or a native application, residing on the client device 114.

In some implementations, the client devices 114 include hardware, software, or embedded logic components or a combination of two or more such components and is configured to carry out the appropriate functions implemented or supported by the client devices 114.

In some implementations, the client devices 114 may include one or more processors, one or more memories, one or more displays, one or more interfaces, one or more components capable of inputting data, one or more components capable of outputting data, one or more components capable of communicating with any other component of the system 100 or any other component suitable for a particular purpose.

The data communication network 108 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of the foregoing.

In some implementations, the biometric server 104 may be a unitary server or may be a distributed server spanning multiple computers or multiple datacenters.

It should be noted that some of the system features described in this specification have been presented as modules or units, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module or unit may also be at least partially implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Additional modules can be included without deviating from the novel art of this disclosure. In addition, each module can include any number and combination of sub-modules, and systems, implemented with any combination of hardware and/or software modules.

Method steps of the invention may be performed by one or more computer processors executing a program tangibly embodied on a computer-readable medium to perform functions of the invention by operating on input and generating output. Suitable processors include, by way of example, both general and special purpose microprocessors. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The invention claimed is:

1. A computer-implemented method for managing associations between a plurality of entities in a networked environment, wherein said computer-implemented method is implemented by a system comprising a processing unit communicably coupled to a blockchain via an identity server, wherein the processing unit further comprises a memory configured to store executable instructions, and wherein the blockchain is configured to store one or more user credentials, the method comprising:
   receiving, at the processing unit, a request from a client device of a requesting entity, for a new connection to at least one of the plurality of entities of a network graph;

obtaining identity data from the client device of the requesting entity, verifying, by the identity server and the blockchain ledger, the identity data received from the client device of the requesting entity;

accessing the network graph of the plurality of entities registered with the processing unit, wherein each of said entities is represented in the network graph by a node, and wherein the network graph comprises pre-identified connections between the plurality of entities, based on an entity profile of each of the plurality of entities;

determining an importance score of each of the nodes in the network graph, in relation to the node representing the requesting entity, by:

obtaining values of one or more attributes, from the client device of the requesting entity, by use of an interactive chat-bot, obtaining values of the one or more attributes, from profiles of the plurality of entities registered with the processing unit, and calculating a correlation between one or more attributes of the requesting entity and the attributes of the profiles;

identifying one or more nodes in the network graph having importance scores above a predetermined threshold;

displaying a list of identified nodes, on a graphical user interface of the client device of the requesting entity;

transmitting a connection request to one or more of the identified entities; and in response to an acceptance of connection request by at least one of the identified entities, updating the network graph, and associating the requesting entity with a client device of each identified entity that has accepted a connection request, through one or more interaction mediums provided by the processing unit though the graphical user interface of the client device of the requesting entity.

2. The computer-implemented method of claim 1 wherein the entity profile comprises metadata and one or more attributes related to an entity and wherein the one or more attribute relates to at least one of personality traits, sexual compatibility, biometric data including DNA and genome samples.

3. The computer-implemented method of claim 1 wherein the network graph is updated after the requesting entity accepts a connection request to at least one entity.

4. The computer-implemented method of claim 1 wherein each of the plurality of entities is authenticated through biometric recognition.

5. The computer-implemented method of claim 1 wherein the method comprises sorting the one or more identified entities based on the determined importance scores.

6. The computer-implemented method of claim 1 further comprise cross-checking information provided by an entity with public data stored on a blockchain ledger.

7. A system for managing associations between a plurality of entities in a networked environment, the system comprising:

a processing unit, comprising a memory configured to store executable instructions;

an identity server communicably coupled to the processing unit and to a blockchain, wherein the blockchain is configured to store one or more user credentials;

wherein the system is configured to:

receive, at the processing unit, a request from a client device of a requesting entity, for a new connection to at least one entity of the plurality of entities of a network graph;

obtain identity data from the client device of the requesting entity;

verify, by the identity server and the blockchain ledger, the identity data received from the client device of the requesting entity;

access the network graph of the plurality of entities registered with the processing unit, wherein each of said entities is represented in the network graph by a node, and wherein the network graph comprises pre-identified connections between the plurality of entities, based on an entity profile of each of the plurality of entities;

determine an importance score of each of the nodes in the network graph, in relation to the node representing the requesting entity, by:

obtain values of one or more attributes, from the client device of the requesting entity, by use of an interactive chat-bot, obtain values of the one or more attributes, from profiles of the plurality of entities registered with the processing unit, and calculate a correlation between one or more attributes of the requesting entity and the attributes of the profiles;

identify one or more nodes in the network graph having importance scores above a predetermined threshold;

display a list of identified nodes, on a graphical user interface of the client device of the requesting entity;

transmit a connection request to one or more of the identified entities; and in response to an acceptance of connection request by at least one of the identified entities, update the network graph, and associate the requesting entity with a client device of each identified entity that has accepted a connection request, through one or more interaction mediums provided by the processing unit through the graphical user interface of the client device of the requesting entity.

8. The system of claim 7 wherein the entity profile comprises one or more attributes of an entity and wherein the one or more attribute relates to at least one of personality traits, sexual compatibility, biometric data including DNA and genome samples.

9. The system of claim 7 wherein the network graph is updated after the requesting entity accepts a connection request to at least one entity.

10. The system of claim 7 wherein each of the plurality of entities are authenticated through biometric recognition.

11. The system of claim 7 wherein the processing unit is further configured to sort the one or more identified entities based on the determined importance scores.

12. The system of claim 7 further comprises cross-checking information provided by an entity with public data stored on a blockchain ledger.

* * * * *